(No Model.)

A. WRIGHT.
CLIP FOR AERIAL ELECTRIC CABLES.

No. 303,961. Patented Aug. 19, 1884.

WITNESSES:
C. H. Louther Jr
Fred. E. Field.

INVENTOR:
Augustus Wright
by Joseph A. Miller & Co
Att'ys

UNITED STATES PATENT OFFICE.

AUGUSTUS WRIGHT, OF PROVIDENCE, RHODE ISLAND.

CLIP FOR AERIAL ELECTRIC CABLES.

SPECIFICATION forming part of Letters Patent No. 303,961, dated August 19, 1884.

Application filed January 17, 1884. (No model.)

*To all whom it may concern:*

Be it known that I, AUGUSTUS WRIGHT, of the city and county of Providence, State of Rhode Island, have invented a new and useful Improvement in Clips for Aerial Electric Cables; and I hereby declare the following to be a full, clear, and exact description of the same, reference being had to the accompanying drawings, forming part of this specification.

This invention has reference to bands or clips by which the electric cables are supported from the sustaining-wires; and it consists in the peculiar and novel construction of the same, by which the band can be secured readily around the cable and prevented from slipping on the same; and, also, in the peculiar form of the double hooks, by which the sustaining-wire can be more readily passed into the hook, as will be more fully set forth hereinafter.

Figure 1:
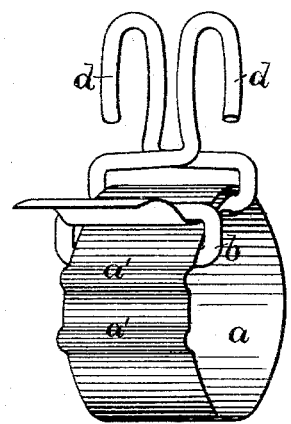
Figure 2:
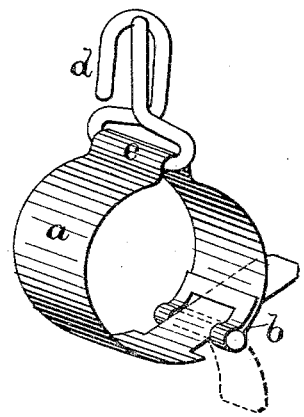
Figure 3:
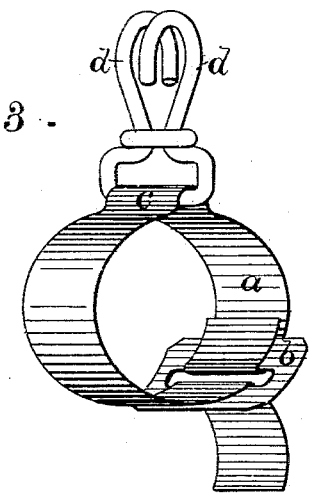
Figure 4:
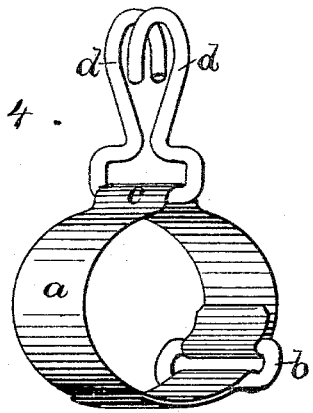

Figure 1 is a perspective view of a clip formed of a crimped sheet-metal strip and a wire loop. Fig. 2 is a perspective view showing one end of the band provided with a loop and the other with a tongue. Fig. 3 is a perspective view showing the ends of the band secured to a sheet-metal loop. Fig. 4 is a perspective view of a clip, the ends of the band being secured by a wire loop.

In the drawings, $a$ is the band or clip, which is secured around the cable, and which should be firmly secured to the cable, so as to prevent any lateral movement on the cable, which causes rupture and injury to the envelope and endangers the durability of the cable, as moisture will enter such abrasion, and the continued wear of a loosely-fitting clip will in a short time destroy the insulation of the wires forming the cable.

To secure a tight embrace on cables and allow the clips to be fitted to cables of different diameters, the band $a$ is made adjustable by means of the loops $b$.

The loops in the different figures all act to secure the band in its contracted form tightly to the cable. In Fig. 1 the band is provided with the crimps $a'\ a'$, into which the loop $b$ is placed, the end passed through the loop and bent over, thus closing the band firmly around the cable. In Fig. 2 the loop $b$ is secured to or formed at one end of the band. A tongue is formed on the other end of the band, and is passed through the loop and bent over the same. In Fig. 3 the sheet-metal loop $b$ is secured to one end of the band by passing the band through and around one side of the loop, and when placed on the cable, passing the other end of the band through the loop and bending it back over the same. In Fig. 4 a wire loop is used, and the ends are secured in the same manner as in Fig. 3.

$c$ is a crease or crimp formed in the band to receive the wire, on both ends of which wire the hooks $d\ d$ are formed. These hooks are made so that the sustaining-wire can enter between the hooks, and by slightly bending the wire and twisting the hooks both hooks can be placed on the wire, and as soon as the cable is adjusted the strain will prevent the unhooking of the clip. The hooks are for this purpose bent in opposite directions, as is clearly shown in the drawings. The clip is preferably fastened around the cable by simply passing its ends or end through the loop, the material of the clip being sufficiently stiff to retain its position against strain.

Having thus described my invention, I claim as new and desire to secure by Letters Patent—

1. In a clip for supporting electric cables, the band $a$ and the loop $b$, constructed to secure the two ends of the band together, and thus bind the clip upon the cable, in combination with attachments, substantially as described, for securing the clip to a supporting-wire, for the purposes set forth.

2. The combination, with the adjustable band and means for securing the same, of the hooks $d\ d$, bent in opposite directions, constructed to sustain the cable, as described.

3. The combination, with the band $a$, provided with the crimp $c$ and the loop $b$, of the double hooks $d\ d$, formed of a single piece of wire, and extending under the band within its crimp, as described.

4. The combination, with the band provided with the crimps $a'\ a'\ c$, of the double hooks $d$, formed of one piece of wire, and passing under the band within the crimp $c$, and the loop $b$, constructed to lie within one of the crimps $a'\ a'$, and to secure the ends of the band, substantially as described.

AUGUSTUS WRIGHT.

Witnesses:
J. A. MILLER, Jr.,
M. F. BLIGH.